United States Patent [19]

Majumdar

[11] Patent Number: 5,397,519
[45] Date of Patent: Mar. 14, 1995

[54] METHOD OF INCORPORATING REINFORCING MATERIAL INTO AN ELASTOMERIC MATRIX

[75] Inventor: Ramendra N. Majumdar, Hudson, Ohio

[73] Assignee: The Goodyear Tire & Rubber Company, Akron, Ohio

[21] Appl. No.: 945,566

[22] Filed: Sep. 16, 1992

[51] Int. Cl.⁶ .......................... D04H 3/16; B29B 9/00
[52] U.S. Cl. .................................. 264/115; 156/167; 264/12; 264/13; 264/121; 524/504; 524/505
[58] Field of Search .................. 264/13, 14, 8, 121, 264/176.1, 211.12, 211.13, 257, 115, 12; 156/167; 524/505, 504; 525/133

[56] References Cited

U.S. PATENT DOCUMENTS

| | | | |
|---|---|---|---|
| 3,972,759 | 8/1976 | Buntin | 156/167 |
| 4,328,133 | 5/1982 | Ogawa et al. | 524/505 |
| 4,396,051 | 8/1983 | Ogawa et al. | 151/203 |
| 4,663,220 | 5/1987 | Wisneski et al. | 428/288 |
| 4,703,086 | 10/1987 | Yamamoto et al. | 525/133 |
| 4,777,080 | 10/1988 | Harris, Jr. et al. | 428/212 |
| 4,900,619 | 2/1990 | Ostrowski et al. | 428/284 |

OTHER PUBLICATIONS

Society of Plastics Engineers, 32nd Annual Tech Conference, May 13–16, 1974.

*Primary Examiner*—James D. Withers
*Attorney, Agent, or Firm*—David E. Wheeler

[57] ABSTRACT

Reinforcing material which does not have a melting point which is compatible with the processing temperature of an elastomer can be incorporated into the elastomer in the form of melt blown fibers. In the method of the invention, melt blown fibers are made by melting a reinforcing material in an extruder, and extruding the reinforcing material through a die comprising many small holes, while simultaneously blowing air or nitrogen, under high pressure, through the die holes, and collecting the resulting material on rotating rolls. The fibers thus formed are mixed into an elastomer using conventional mixing means. A composite made by the method is also provided.

3 Claims, 1 Drawing Sheet

METHOD OF INCORPORATING REINFORCING MATERIAL INTO AN ELASTOMERIC MATRIX

BACKGROUND OF THE INVENTION

The invention relates to a fiber reinforced composite wherein the fiber comprises melt blown fibers and a method therefor.

Fiber reinforcement of elastomeric articles is well known in the art. Conventional fiber reinforcement usually improves the modulus properties of an elastomer while sacrificing tensile properties, tear properties and hysteresis properties. Accordingly, the amount of a fiber reinforcement used in an elastomer is usually a trade off between the increase in modulus desired and the loss of other properties that can be tolerated.

Kevlar ® (polyaromatic amide) fibers are one of the most widely used reinforcing fibers. Such fibers are expensive, although they do provide excellent modulus properties in an elastomeric matrix in which they are used. Conventional Kevlar ® fibers are ordinarily used in low concentration in rubber products (about 2 to 8 phr (parts by weight per hundred parts by weight rubber)) because of their large size and because they do not mix well with rubber, and do not adhere well to rubber. Because of their large size and low adhesion, if the Kevlar ® fibers are used in too high concentration, they tend to weaken the elastomer matrix.

Recently, the trend has been to try using micro fibers as elastomer reinforcement in order to obviate some of the problems described above. Micro fibers are, on average, on the order of 0.1 to 10 microns in diameter, with an aspect ratio of 1 to, substantially, infinity. Micro fibers have been made from many materials, some of which show good adhesion and good compatibility with rubber.

One method of incorporating thermoplastic microfibers in an elastomer is to co-extrude a thermoplastic polymer with an elastomer according to Goodyear Tire & Rubber Co. U.S. Pat. No. 5,364,905 issued Nov. 15, 1994 and U.S. Pat. No. 5,225,457 issued Jul. 6, 1993. Unfortunately, only thermoplastics that have a melting point close to the processing temperature of the elastomer can be used in this technique. There is no method provided in the art for incorporating microfibers of some of the most economical and useful reinforcing fibers, such as PET, nylon 6, polyurethane, high syndiotactic poly (1,2-butadiene) (Syndio), and block copolymer such as polystyrene/olefin/styrene in an elastomer. An example of the latter is Kraton ® polymer, available from Shell Chemical Company.

It is an object of this invention to provide a method for incorporating micro fibers, that have melting points outside the range of the processing temperature of elastomers, into an elastomer. It is also an object of the invention to provide an elastomer reinforced with such fibers. Other objects of the invention will be apparent from the following description and claims.

SUMMARY OF THE INVENTION

An elastomeric composite material comprising an elastomeric matrix reinforced with 2 to 20 phr melt blown fibers is provided. The melt blown fibers are preferably made from materials having a melting point higher than the processing temperature of rubber. The composite demonstrates a storage modulus (E') of $1.3 \times 10^8$ to $2 \times 10^9$ dynes/sq in at 25° C., a 50% modulus of 180–660 psi, and a cut growth of 7 to 14 mm at 240 cycles at 93° C. as measured using the P. G. Flex Test. Particularly improved properties have been noted in an embodiment where an additive to the elastomer increases the adhesion between the fibers and the elastomeric matrix.

In a preferred embodiment, the composite comprises rubber, melt blown fibers, carbon black and phenolic resin.

In the method of the invention, the melt blown fibers are prepared by mixing reinforcing material in an extruder, extruding molten reinforcing material through a die having multiple die holes while simultaneously blowing gas, preferably air, under high pressure through the die holes, and collecting the extruded material on rotating rolls, optionally chilled rolls. The melt blown fibers are then dumped into an elastomer composition during mixing thereof. In a preferred embodiment, the method further includes the step of adding a material which promotes the adhesion of fibers to the elastomer composition during the mixing.

Composites of the invention are less expensive to produce than conventional composites of this type, and have demonstrated a 17 fold increase in storage modulus. It is believed that cut growth properties and hysteresis properties can be maintained substantially equivalent to the unreinforced elastomer in such a composite.

DETAILED DESCRIPTION OF THE INVENTION

Figure 1:
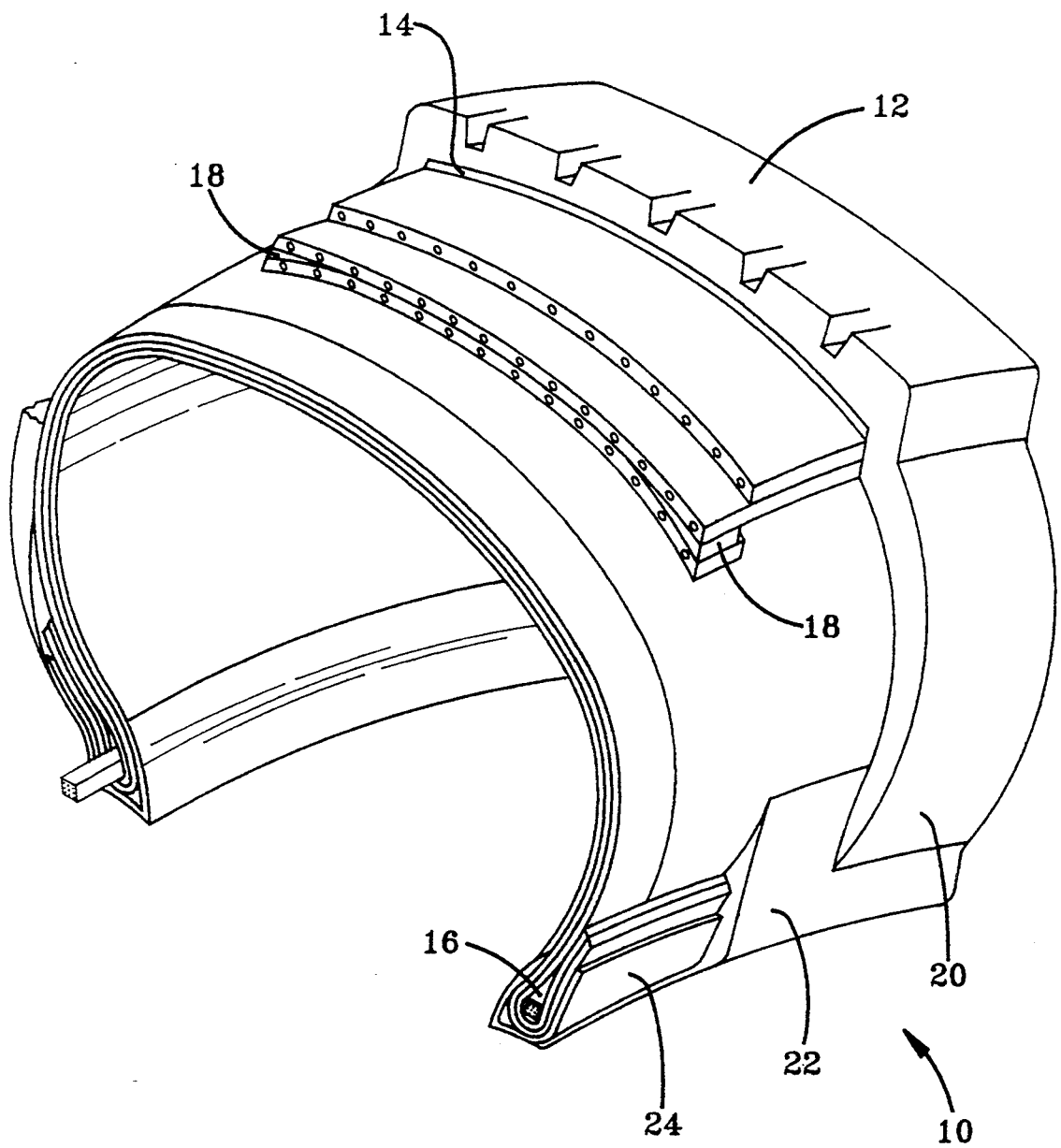
FIG. 1 illustrates a tire reinforced by melt blown fibers.

The elastomer of the fiber reinforced composite of the invention can be any known elastomer. Examples of elastomers that can be used include natural rubber, synthetic natural rubber, styrene butadiene rubber, isoprene rubber, and EPDM rubber. Rubber is a particularly preferred elastomer for use in the invention.

Elastomers contemplated for use in the invention have a processing temperatures of 51° to 190° C. (150° to 400° F.). Since some reinforcing materials can be incorporated into an elastomer during the processing thereof, if the melting point of the reinforcing material is compatible with the processing temperature of the elastomer, this invention is concerned with a method of incorporating therein a reinforcing material that does not have a melting point that is compatible with the processing temperature of the elastomer, and the composite made by the method.

Some of the more desirable reinforcing materials, such as polyethylene terephthalate (PET), Nylon 6, Polyurethane, polyether urethane, Syndio, and Kraton ®, are among those reinforcing materials that do not have a melting point that is compatible with elastomer processing. Such materials have melting points in the range of 150° to 280° C. (328° to 562° F.).

It has been discovered that the above listed polymers, and similar materials, can be easily and economically incorporated into an elastomer in the form of melt blown fibers. Melt blown fibers are made by melting the material in an extruder and passing the melted material through a die with multiple holes while high pressure air is blown through the holes. The continuous or discontinuous melt blown fibers are collected on rotating rolls, optionally chilled rolls, and are generally 0.1 to 400 microns in diameter, with an aspect ratio of 1 to, in the case of continuous fibers, substantially infinity.

PET melt blown fibers have an average diameter of about 4 microns. Nylon 6 melt blown fibers have an average diameter of about 8 microns.

Because of their small size, the melt blown fibers blend well into a mixing elastomer without clumping or matting, and elastomer compositions incorporating up to 60 phr can be easily prepared, with good fiber dispersion, in conventional mixing equipment.

In a further embodiment of the invention, an additive may be dispersed in the elastomer that promotes adhesion between the elastomer and the melt blown fibers. Using phenolic resin as such an additive, the inventor has found a 17 fold improvement in storage modulus (E') when 2 phr melt blown PET and 6 phr phenolic resin are incorporated in a natural rubber/polyisoprene blend. Although cut growth properties of the composition were not in the range desired, it is believed that by controlling the size of the melt blown fiber and by varying the amount of fiber and additive used, that the improvement in storage modulus can be maintained while cut growth properties, hysteresis properties and tensile properties substantially equivalent to the nonreinforced elastomer can be maintained.

Examples of additives that can be used in the invention are phenolic resin, silica, hydrated silica, and chemical precursors thereof.

In the method of the invention, the melt blown fibers are prepared by melting reinforcing material in an extruder, extruding molten reinforcing material through a die having multiple die holes while simultaneously blowing air or nitrogen under high pressure through the die holes, and collecting the extruded material on chilled, rotating rolls. The melt blown fibers are then dumped into an elastomer composition during mixing thereof. In a preferred embodiment, the method further includes the step of adding to the elastomer composition, during said mixing, a material which promotes the adhesion of fibers to an elastomer.

It is contemplated that elastomer composites made using melt blown fibers can be used to reinforce tire components. With reference now to FIG. 1, it is believed that the increased storage modulus of the reinforced elastomer will show beneficial properties in the tread 12 or the tread base 14 of tire 10. Other components of tire 10 that may be beneficially reinforced with melt blown fibers include apex 16 and wedge 18. The melt blown fibers may also be of use in sidewalls 20, chafer 22, and toe guard 24. Other uses of melt blown fibers in tires will be apparent to those skilled in the art since prior art demonstrates, through a number of sources collectively, fiber reinforcement in every part of a tire.

The invention is further illustrated with reference to the following examples.

EXAMPLE

Blending and Curing

Two and twenty phr melt blown fibers were added to Natsyn cement, which was then precipitated into isopropanol and dried. Natsyn master batches containing melt blown fibers were formulated into the formulation described below. A Haake unit with attached Banbury type mixer was used for blending. This elastomer formulation was used for all the examples described herein unless indicated otherwise.

| INGREDIENT | gm |
| --- | --- |
| Natsyn or High cis polyisoprene | 34.3 |
| Carbon Black | 15.4 |
| Napthenic/Paraffin medium process oil | 3.08 |
| N-(1,3-dimethylbutyl)N'-phenyl-p-phenylenediamine | 0.69 |
| Aryl-p-phenylenediamine | 0.34 |
| Paraffinic Microcrystalline Wax | 0.34 |
| Stearic acid | 1.03 |
| Zinc oxide | 1.03 |
| N-oxydiethylenebenzothiazole-2-sulfenamide | 0.27 |
| Symmetrical diphenylguanidine | 0.14 |
| Sulfur | 0.55 |
| TOTAL | 57.17 |

Natsyn is synthetic natural rubber (cis polyisoprene).

Curing time of various stocks were determined using the Monsanto tester.

Tables 1 and 2 show the tensile properties of the above formulation modified with melt blown fibers (as received from 3M Company). Addition of 2 and 20 phr melt blown PET fibers improves the 50% modulus by 23% and 100% respectively. Improvements were 16% and 294% respectively, when melt blown nylon 6 fibers were used instead of PET.

TABLE 1

TENSILE PROPERTIES OF RUBBER MODIFIED WITH 20 PHR MELT BLOWN FIBERS (MBF)

| | | MODULUS[a] | | | ELONGATION[b] | BREAK[a] |
| --- | --- | --- | --- | --- | --- | --- |
| | | 50% | 100% | 300% | AT BREAK | LOAD |
| 1. | Elastomer | 141 | 260 | 1406 | 546 | 3884 |
| | | (5) | (11) | (95) | (25) | (215) |
| 2. | Elastomer + 20 phr CB | 189 | 378 | 2137 | 455 | 3682 |
| | | (11) | (21) | (50) | (18) | (208) |
| 3. | Elastomer + 20 phr N-6 MBF | 559 | 668 | — | 250 | 1270 |
| | | (48) | (56) | | (29) | (106) |
| 4. | Elastomer + 20 phr PET MBF | 366 | 487 | 1494 | 353 | 1270 |
| | | (44) | (44) | (126) | (15) | (226) |

[a] In psi

[b] In % and numbers in bracket show the standard deviation

TABLE 2
TENSILE PROPERTIES OF RUBBER MODIFIED WITH 2 PHR MELT BLOWN FIBERS (MBF)

| SAMPLE | 50% | MODULUS (PSI) 100% | 300% | ELONGATION AT BREAK % | LOAD AT BREAK PS |
|---|---|---|---|---|---|
| 1. Elastomer | 163.5 | 266 | 1159 | 639.8 | 4252 |
| 2. Elastomer + 2 phr extra CB | 157.3 | 255 | 1175 | 644.5 | 4140 |
| 3. Elastomer + 2 phr N-6 MBF | 190.0 | 293.9 | 1208 | 603.2 | 3928 |
| 4. Elastomer + 2 phr PET MBF | 200.4 | 305.1 | 1201 | 611.1 | 3966 |

Table 3 shows the storage modulus (E') at 25 C, tan delta at 0 and 60 C and their difference. Clearly, addition of 2 phr melt blown PET in conjunction with six phr additive phenolic resin (Durez 13355 from Occidental Chemical) results in ten fold increase in storage modulus. The tan delta value at 60 C increased very slightly compared to control thus indicating little increase in hysteresis.

TABLE 3
LOSS MODULUS (E') AND TAN DELTA VALUES OF ELASTOMER AND ITS MODIFIED COMPOSITIONS

| SAMPLE | E' AT 25° C. DYNES/SQ CM | TAN DELTA 0° C. | 60° C. | DIFF |
|---|---|---|---|---|
| Elastomer | 1.087E + 8 | 0.1825 | 0.1217 | 0.0608 |
| Elastomer + 2 phr CB | 1.108E + 8 | 0.1924 | 0.1302 | 0.0622 |
| Elastomer + 6 phr CB | 1.313E + 8 | 0.1972 | 0.1320 | 0.0652 |
| Elastomer + 8 phr CB | 1.572E + 8 | 0.1905 | 0.1423 | 0.0482 |
| Elastomer + 2 phr MB-PET | 1.392E + 8 | 0.1777 | 0.1130 | 0.0647 |
| Elastomer + 2 phr MB-N6 | 1.352E + 8 | 0.1764 | 0.1225 | 0.0539 |
| Elastomer + 6 phr Durez | 1.229E + 8 | 0.1727 | 0.1077 | 0.0650 |
| Elastomer + 2 phr MB-PET + 6 phr Durez | 1.876E + 9 | 0.1773 | 0.1294 | 0.0479 |

Data for hot P. G. Flex tests (at 93 C) are shown in Table 4. Clearly, addition of two phr melt blown PET or nylon six showed better cut-growth properties compared to control with two phr extra carbon black. The cut growth property slightly deteriorates when PET is added in conjunction with phenolic resin. However, it is likely that by optimizing the amounts of melt blown PET fibers and phenolic resin, storage modulus at room temperature can be improved without sacrificing the cut growth properties.

TABLE 4
P.G. FLEX TEST AT 93° C. OF ELASTOMER MODIFIED RECIPE

| SAMPLE | 5 | 15 | 30 | CYCLES 60 | 120 | 180 | 240 |
|---|---|---|---|---|---|---|---|
| Elastomer | 1 | 2 | 3 | 5 | 7 | 7 | 8 |
| Elastomer + 2 phr CB | 1 | 2 | 4 | 7 | 11 | 13 | 16 |
| Elastomer + 2 phr MB-PET | 1 | 1 | 3 | 3 | 7 | 8 | 11 |
| Elastomer + 2 phr MB-N6 | 1 | 2 | 3 | 3 | 4 | 4 | 7 |
| Elastomer + 6 phr Durez | 1 | 2 | 3 | 4 | 7 | 9 | 11 |
| Elastomer + 2 phr MB-PET + 6 phr Durez | 2 | 4 | 8 | 11 | 13 | 17 | 20 |

While the invention has been specifically illustrated and described, those skilled in the art will recognize that the invention can be variously modified and practiced without departing from the spirit of the invention. The invention is limited only by the following claims.

What is claimed is:

1. A method for incorporating reinforcing material into an elastomeric matfix comprising the steps of:
    (a) melting a reinforcing material having a melting point of 150° to 280° C. in an extruder;
    (b) extruding molten reinforcing material through a die having multiple holes while simultaneously blowing air under high pressure through said holes;
    (c) collecting the extruded material on rotating rolls, causing the material to solidify in the form of fibers having a diameter of 0.1 to 400 microns; and,
    (d) dumping said fibers into an elastomer composition having a processing temperature below the melting temperature of said fibers during mixing thereof; and
    (e) adding a material to said elastomer which promotes adhesion of said fibers to said elastomer during mixing thereof.

2. The method of claim 1 wherein step (d) further includes the step of providing 2 to 20 parts by weight per hundred parts by weight elastomer of said fiber to said elastomer during mixing.

3. The method of claim 1 which further comprises the step of selecting said additive adhesive promoting material to be phenolic resin.

* * * * *